(12) United States Patent
Yao et al.

(10) Patent No.: US 7,535,681 B2
(45) Date of Patent: May 19, 2009

(54) MICRO-ACTUATOR INCLUDING SIDE ARMS HAVING BACK-TURNED EXTENSIONS, HEAD GIMBAL ASSEMBLY AND DISK DRIVE UNIT WITH THE SAME

(75) Inventors: MingGao Yao, DongGuan (CN); Masashi Shiraishi, HongKong (CN)

(73) Assignee: SAE Magentics (H.K.) Ltd., Hong Kong (CN)

( * ) Notice: Subject to any disclaimer, the term of this patent is extended or adjusted under 35 U.S.C. 154(b) by 400 days.

(21) Appl. No.: 11/192,121

(22) Filed: Jul. 29, 2005

(65) Prior Publication Data

US 2007/0025025 A1   Feb. 1, 2007

(51) Int. Cl.
*G11B 5/596* (2006.01)
*G11B 21/10* (2006.01)
*G11B 21/21* (2006.01)

(52) U.S. Cl. .................................. 360/294.4
(58) Field of Classification Search ............... 360/294.4
See application file for complete search history.

(56) References Cited

U.S. PATENT DOCUMENTS

| | | | |
|---|---|---|---|
| 5,299,081 A | 3/1994 | Hatch et al. .............. 360/104 |
| 5,611,707 A | 3/1997 | Meynier .................... 439/353 |
| 5,636,089 A | 6/1997 | Jurgenson et al. ......... 360/104 |
| 5,898,544 A | 4/1999 | Krinke et al. ............. 360/104 |
| 6,198,606 B1 | 3/2001 | Boutaghou et al. ....... 360/294.3 |
| 6,246,522 B1 * | 6/2001 | Ishii .......................... 359/571 |
| 6,531,805 B2 * | 3/2003 | Ikeda et al. ................ 310/331 |
| 6,538,836 B1 | 3/2003 | Dunfield et al. ............. 360/75 |
| 6,617,763 B2 | 9/2003 | Mita et al. .................. 310/328 |
| 6,624,984 B2 | 9/2003 | Lewis et al. .............. 360/297.1 |
| 6,671,131 B2 | 12/2003 | Kasajima et al. ......... 360/294.4 |
| 6,700,727 B1 | 3/2004 | Crane et al. ................. 360/75 |
| 6,700,749 B2 | 3/2004 | Shiraishi et al. .......... 360/294.4 |
| 6,950,266 B1 | 9/2005 | McCaslin et al. ............ 360/75 |
| 2003/0147177 A1 | 8/2003 | Yao et al. ................. 360/244.7 |
| 2003/0147181 A1 | 8/2003 | Shiraishi et al. .......... 360/294.4 |

(Continued)

FOREIGN PATENT DOCUMENTS

| | | |
|---|---|---|
| JP | 2002-74871 | 3/2002 |
| JP | 2002-133803 | 5/2002 |

OTHER PUBLICATIONS

U.S. Appl. No. 11/238,998, filed Sep. 2005, Yang et al.

(Continued)

*Primary Examiner*—William J Klimowicz
(74) *Attorney, Agent, or Firm*—Nixon & Vanderhye P.C.

(57) ABSTRACT

A micro-actuator of the invention includes a support base having two actuator side arms and a rotatable bottom plate positioned between the actuator side arms; wherein at least one of the actuator side arms having a back-turned extension in a first end thereof; a pair of connection elements that connects the rotatable bottom plate to the actuator side arms in a second end thereof, respectively; at least one PZT elements bonded to the actuator side arms in its length and the back-turned extension. The rotatable plate rotates in a first direction when the at least one PZT elements expand, and a second direction when the at least one PZT elements contract. The invention also discloses a HGA and disk drive unit with such a micro-actuator.

16 Claims, 10 Drawing Sheets

U.S. PATENT DOCUMENTS

| | | | |
|---|---|---|---|
| 2003/0168935 A1 | 9/2003 | Ogawa et al. | 310/328 |
| 2004/0001288 A1* | 1/2004 | Yao et al. | 360/294.3 |
| 2006/0023338 A1 | 2/2006 | Sharma et al. | 360/75 |
| 2006/0050442 A1 | 3/2006 | Yao et al. | 360/294.4 |
| 2006/0072247 A1 | 4/2006 | Yao et al. | 360/294.4 |
| 2006/0082917 A1 | 4/2006 | Yao et al. | 360/75 |
| 2006/0098347 A1 | 5/2006 | Yao et al. | 360/294.4 |
| 2006/0146449 A1 | 7/2006 | Yao et al. | 360/294.4 |

OTHER PUBLICATIONS

U.S. Appl. No. 11/169,019, filed Jun. 2005, Yao et al.
U.S. Appl. No. 11/080,659, filed Mar. 2005, Yao et al.
U.S. Appl. No. 11/050,823, filed Jan. 2005, Yao et al.
U.S. Appl. No. 11/080,657, filed Mar. 2005, Zhu et al.
U.S. Appl. No. 11/235,549, filed Sep. 2005, Yao et al.
U.S. Appl. No. 11/304,623, filed Dec. 2005, Yao et al.
U.S. Appl. No. 11/169,003, filed Jun. 2005, Yao et al.
U.S. Appl. No. 11/125,248, filed May 2005, Yao et al.
U.S. Appl. No. 11/263,998, filed Nov. 2005, Yao.
U.S. Appl. No. 11/265,385, filed Nov. 2005, Yao et al.
U.S. Appl. No. 11/304,544, filed Dec. 2005, Yao.
U.S. Appl. No. 11/300,339, filed Dec. 2005, Yao et al.
U.S. Appl. No. 11/385,704, filed Mar. 2006, Yao et al.
U.S. Appl. No. 11/385,698, filed Mar. 2006, Yao et al.
U.S. Appl. No. 11/319,577, filed Dec. 2005, Yao et al.
U.S. Appl. No. 11/353,018, filed Feb. 2006, Yao.
U.S. Appl. No. 11/273,075, filed Nov. 2005, Yao.
U.S. Appl. No. 11/319,580, filed Dec. 2005, Yao et al.
U.S. Appl. No. 11/384,404, filed Mar. 2006, Yao.
U.S. Appl. No. 11/414,546, filed May 2006, Yao et al.
U.S. Appl. No. 11/440,354, filed May 2006, Li.

* cited by examiner

MICRO-ACTUATOR INCLUDING SIDE ARMS HAVING BACK-TURNED EXTENSIONS, HEAD GIMBAL ASSEMBLY AND DISK DRIVE UNIT WITH THE SAME

FIELD OF THE INVENTION

The present invention generally relates to disk drives, such as hard disk drives (HDDs), and particularly to a rotatable micro-actuator and a head gimbal assembly (HGA) using the micro-actuator for the disk drives.

BACKGROUND OF THE INVENTION

Disk drives are information storage devices that use magnetic media to store data. A conventional disk drive comprises a magnetic disk having concentric magnetic tracks formed thereon, a HGA, and a drive arm that drives the HGA. The disk is mounted to a spindle motor, which causes the disk to spin. A voice-coil motor (VCM) controls the motion of the drive arm, which in turn controls the movement of the HGA, and then controls the slider to move from track to track across the surface of the disk for reading data from or writing data to the disk.

However, because of inherent tolerance resulting from the VCM and the suspension, the slider does not attain precise positional control during its displacement. This will affect data reading/writing of the slider.

To solve the above-mentioned problem, piezoelectric (PZT) micro-actuators are employed to modify the displacement of the slider. That is, the PZT micro-actuator corrects the displacement of the slider in a much smaller scale to compensate for the tolerance caused by the VCM and the suspension. The PZT micro-actuator enables a smaller recording track width, hence increasing the "tracks per inch (TPI)" value by 50%. It also reduces the head seeking and settling time, increases the disk surface recording density, and improves drive performance of the disk drive.

Figures 1A, 1B:
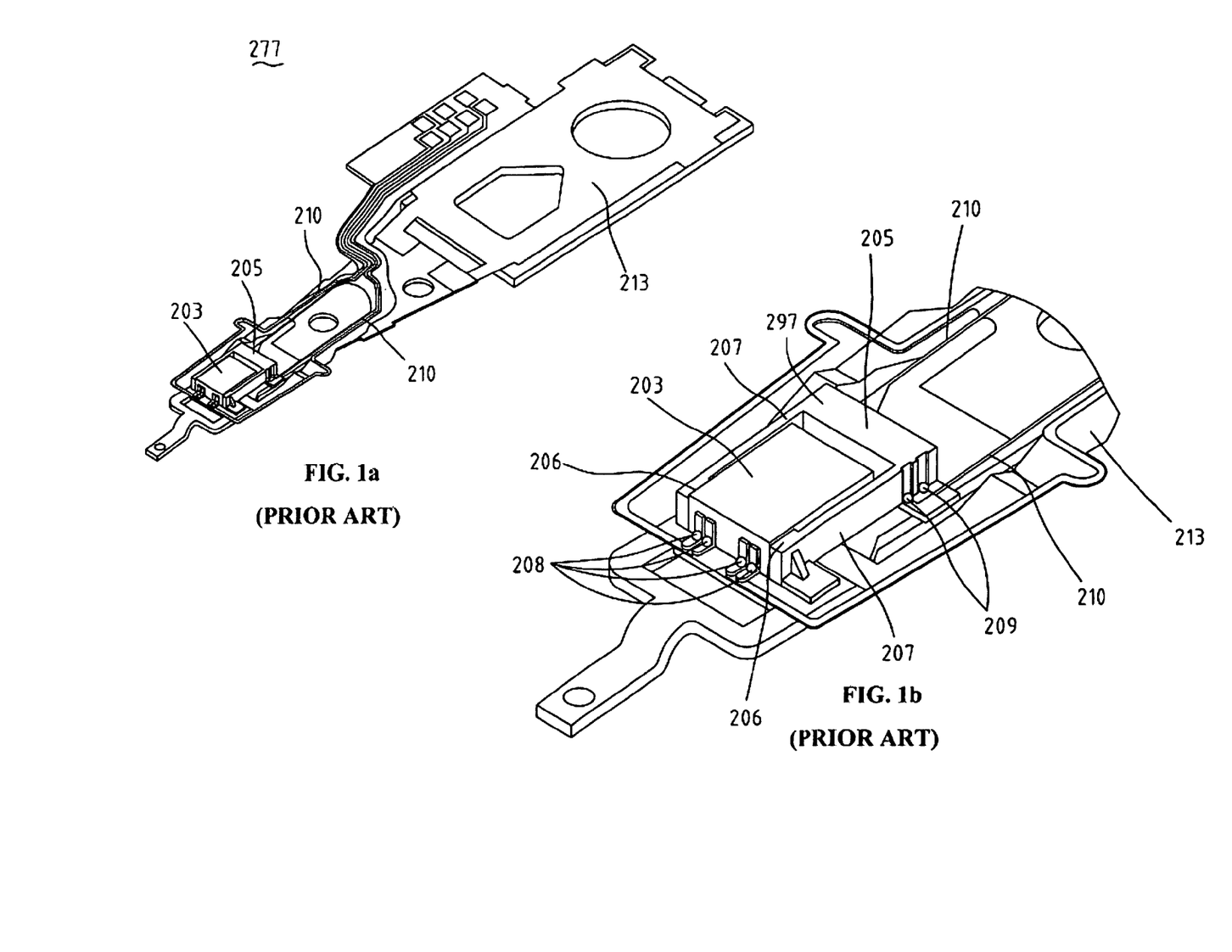

Referring to FIGS. 1a and 1b, a traditional HGA 277 comprises a slider 203, a PZT micro-actuator 205, and a suspension 213 to load the micro-actuator 205 and a suspension 213. The PZT micro-actuator 205 comprises a U-shaped ceramic frame 297 having two spaced beams 207 on both sides of which two PZT elements (not labeled) are mounted. The PZT micro-actuator 205 is mounted to a suspension 213 of the HGA 277. The suspension 213 comprises conductive traces 210 that are connected to the micro-actuator 205 by a plurality of electrical connection balls 209, such as gold ball bonding (GBB) and solder ball bonding (SBB), on both sides of the frame 297 next to each beam 207. In addition, a plurality of metal balls 208, such as GBB and SBB, electrically connect the slider 203 to the conductive traces 210.

Figure 1C:
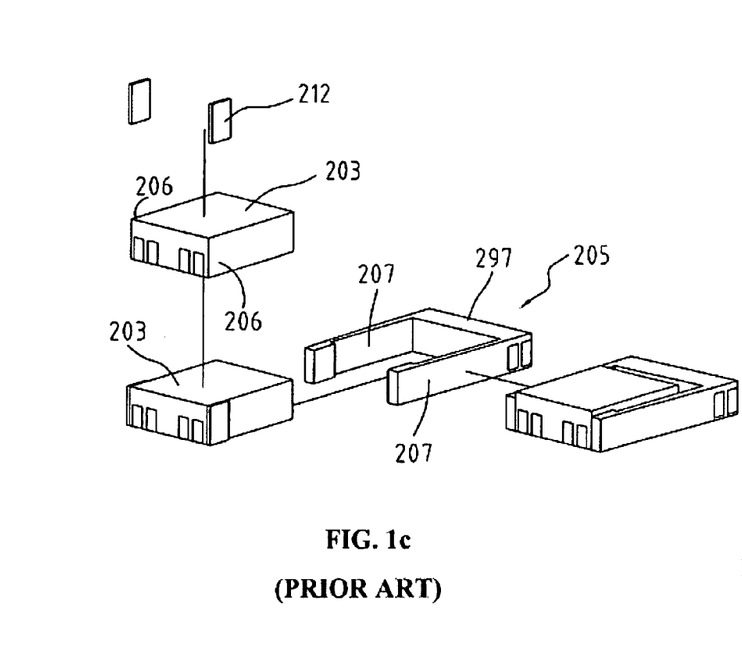

Also referring to FIG. 1c, the slider 203 is positioned in the micro-actuator 205 between the beams 207. The slider 203 is bonded to the beams 207 at two points 206 by epoxy dots 212 whereby the slider 203 is movable in unison with the beams 207. When power is supplied through the traces 210, the PZT elements of the micro-actuator 205 expand or contact, causing the beams 207 to deform and thus moving the slider 203 on the tracks of the disk. Thus, a fine head position adjustment of the slider 203 can be attained.

However, since the PZT micro-actuator 205 and the slider 203 are mounted to a suspension tongue (not labeled), the PZT micro-actuator 205, when excited, undergoes pure translation, which sways the slider 203 due to the constraint imposed by the U-shaped frame 297 of the micro-actuator 205 and causes a suspension vibration resonance having a frequency the same as the suspension base plate exciting. This limits the servo bandwidth and capacity improvement of hard disk drive.

Thus, it is desired to provide a micro-actuator, a HGA and a disk drive to solve the above-mentioned problems.

SUMMARY OF THE INVENTION

An main feature of the present invention is to provide a micro-actuator and a head gimbal assembly, which can attain a bigger head position adjustment capacity and enhanced resonance performance when the micro-actuator is excited.

Another objective of the present invention is to provide a disk drive unit with large servo bandwidth and capacity.

To achieve the above-mentioned features, in accordance with an embodiment of the present invention, a micro-actuator comprises a support base having two actuator side arms and a rotatable bottom plate positioned between the actuator side arms; wherein at least one of the actuator side arms having a back-turned extension in a first end thereof; a pair of connection elements that connects the rotatable bottom plate to the actuator side arms in a second end thereof, respectively; at least one PZT elements bonded to the actuator side arms in its length and the back-turned extension; wherein the rotatable plate rotates in a first direction when the at least one PZT elements expand, and a second direction when the at least one PZT elements contract.

As an embodiment of the invention, the actuator side arm comprises a side arm body, the back-turned extension extends from one end thereof toward the other end thereof, and a notch is formed between the side arm body and the back-turned extension. The notch has additional material filled therein. The additional material is selected from epoxy, adhesive, polymer, metal material. As a further embodiment, the actuator side arm comprises a side arm body, and the back-turned extension bonded on an end of the side arm body. The back-turned extension has a solid structure. According to another embodiment of the invention, the back-turned extension further comprises an elongated portion for bonding with the side arm body firmly. Thus, in the invention, when a slider is mounted on the rotatable bottom plate, upon application of electrical power to the piezoelectric elements, the side arms are deflected in opposite directions due to the deformation of the piezoelectric elements, thereby rotating and thus displacing the slider in a larger scope as compared to prior art micro-actuators. In addition, because there is a back-turned extension on the side arm, the length of the side arms can thus be increased, which allows the PZT elements attached to the side arms to be elongated and thus improving the displacement performance of the micro-actuator.

A HGA of the present invention comprises a slider; a micro-actuator; and a suspension for supporting the micro-actuator; wherein a parallel gap exists between the suspension and a bottom of the micro-actuator; wherein the micro-actuator comprises a support base having two actuator side arms and a rotatable bottom plate positioned between the actuator side arms; wherein at least one of the actuator side arms having a back-turned extension in a first end thereof; a pair of connection elements that connects the rotatable bottom plate to the actuator side arms in a second end thereof, respectively; at least one PZT elements bonded to the actuator side arms in its length and the back-turned extension; wherein the rotatable plate rotates in a first direction when the at least one PZT elements expand, and a second direction when the at least one PZT elements contract; wherein the slider is bonded with the actuator side arms in two points which are diagonally opposite with each other, and at least one point is on the back-turned extension.

A disk drive unit of the present invention comprises a HGA, which comprising a slider, a micro-actuator and a suspension supporting the micro-actuator; a drive arm connected to the head gimbal assembly; a disk; and a spindle motor operable to spin the disk; wherein the micro-actuator comprises: a support base having two actuator side arms and a rotatable bottom plate positioned between the actuator side arms; wherein at least one of the actuator side arms having a back-turned extension in a first end thereof; a pair of connection elements that connects the rotatable bottom plate to the actuator side arms in a second end thereof, respectively; at least one PZT elements bonded to the actuator side arms in its length and the back-turned extension; wherein the rotatable plate rotates in a first direction when the at least one PZT elements expand, and a second direction when the at least one PZT elements contract; wherein the slider is bonded with the actuator side arms in two points which are diagonally opposite with each other, and at least one point is on the back-turned extension.

Compared with the conventional devices, the slider in accordance with the present invention is only partially bonded to the side arms of the support base of the micro-actuator in two diagonally points. This allows the slider to rotate when the micro-actuator is actuated for attaining fine position adjustment. In addition, suspension resonance is not caused when the micro-actuator is operated in lower frequency and only a pure micro-actuator resonance occurs in high frequency. This enlarges the servo bandwidth and thus improves the capacity of the disk drive. Further, the spring structure of the support base of the micro-actuator makes the position adjustment for the slider more freely as compared to the conventional devices.

The present invention will become more obvious from the following description when taken in connection with the accompanying drawings, which show, for purposes of illustration only, preferred embodiments in accordance with the present invention. In the drawings:

BRIEF DESCRIPTION OF THE DRAWINGS

FIG. 1a is a perspective view of a conventional HGA;

FIG. 1b is a perspective view, in an enlarged scale as compared to FIG. 1a, showing a suspension tongue area of FIG. 1a;

FIG. 1c schematically illustrates an assembling process for mounting a slider in a micro-actuator of the HGA in FIG. 1a;

FIG. 11a is an exploded view of a support base of a micro-actuator in accordance with a third embodiment of the present invention;

FIG. 11b is an assembled view of the support base of FIG. 11a;

FIG. 11c is an exploded view of the micro-actuator in accordance with the third embodiment of the present invention with the slider detached therefrom;

FIG. 11d is an assembled view of FIG. 11c;

FIG. 12b is an assembled view of FIG. 12a;

FIG. 13a is an exploded view of a support base of a micro-actuator in accordance with a fifth embodiment of the present invention;

FIG. 13b is an assembled view of the frame of FIG. 13a;

FIG. 13c is an exploded view of the micro-actuator in accordance with the fifth embodiment of the present invention with the slider detached therefrom;

FIG. 13d is an assembled view of FIG. 13c;

DETAILED DESCRIPTION OF THE PREFERRED EMBODIMENTS

Figure 14:
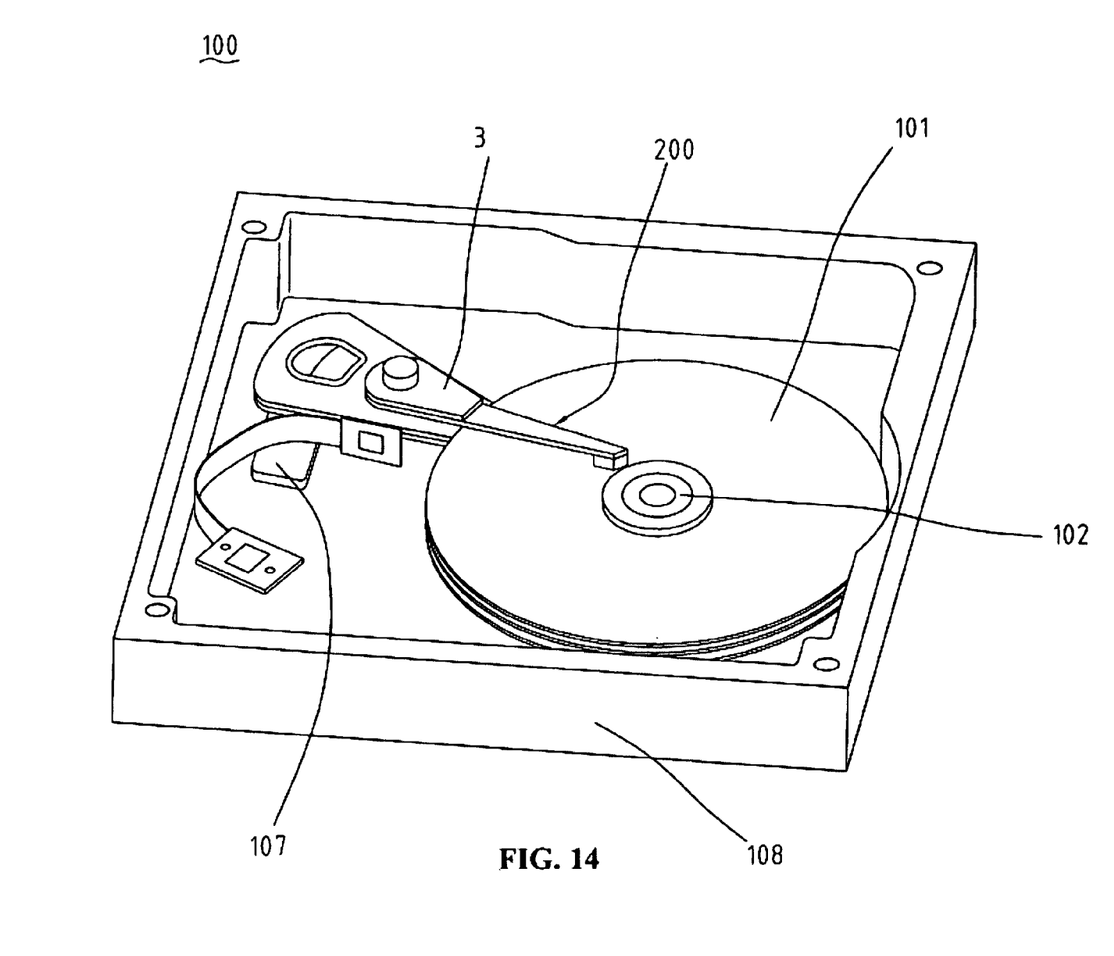
FIG. 14 is a perspective view showing a disk drive incorporating the HGA and the micro-actuator in accordance with the present invention.

With reference to the drawings, and in particular to FIG. 14, a disk drive constructed in accordance with an embodiment of the present invention, generally designated with reference numeral 100, comprises a housing 108 containing a set of circular disks 101 each having a surface on which a magnetic coating is provided for forming a plurality of concentric tracks (not shown). The disks 101 are mounted on a spindle motor 102 that selectively spins the disks 101. A drive arm 3 is arranged in the housing 108 and is controlled by a voice-coil motor 107 to drive a HGA constructed in accordance with a first embodiment of the present invention, generally designated with reference numeral 200, with respect to the disks 101, whereby a slider 31 (see FIG. 2) carried by the HGA 200 is movable across the surface of the disk 101 from track to track.

Also referring to FIGS. 2-5, the HGA 200 comprises a suspension 8 having a base plate 11, made of for example metals, ceramics, and polymers, and a hinge 15 coupled to the drive arm 3 of the disk drive 100, and a flexure 13 that connects with the base plate 11 to support a load beam 17. The flexure 13 comprises a suspension tongue 328 that carries a rotatable micro-actuator 32 and the slider 31. On the base plate 11, a plurality of conductive pads 308 are mounted for coupling with a control system (not shown) of the disk drive 100. Conductive traces 309, 311 are formed on the suspension 8 and extend from the pads 308 to conductive pads 310, 113 formed on the suspension tongue 328, respectively, for electrically connecting the micro-actuator 32, which is electrically connected to the pad 310 by metal balls 332, such as GBB or SBB, and the slider 31 that are electrically connected to the pads 113 by metal balls 405, such as GBB or SBB, respectively, to the control system.

Figures 7, 8:
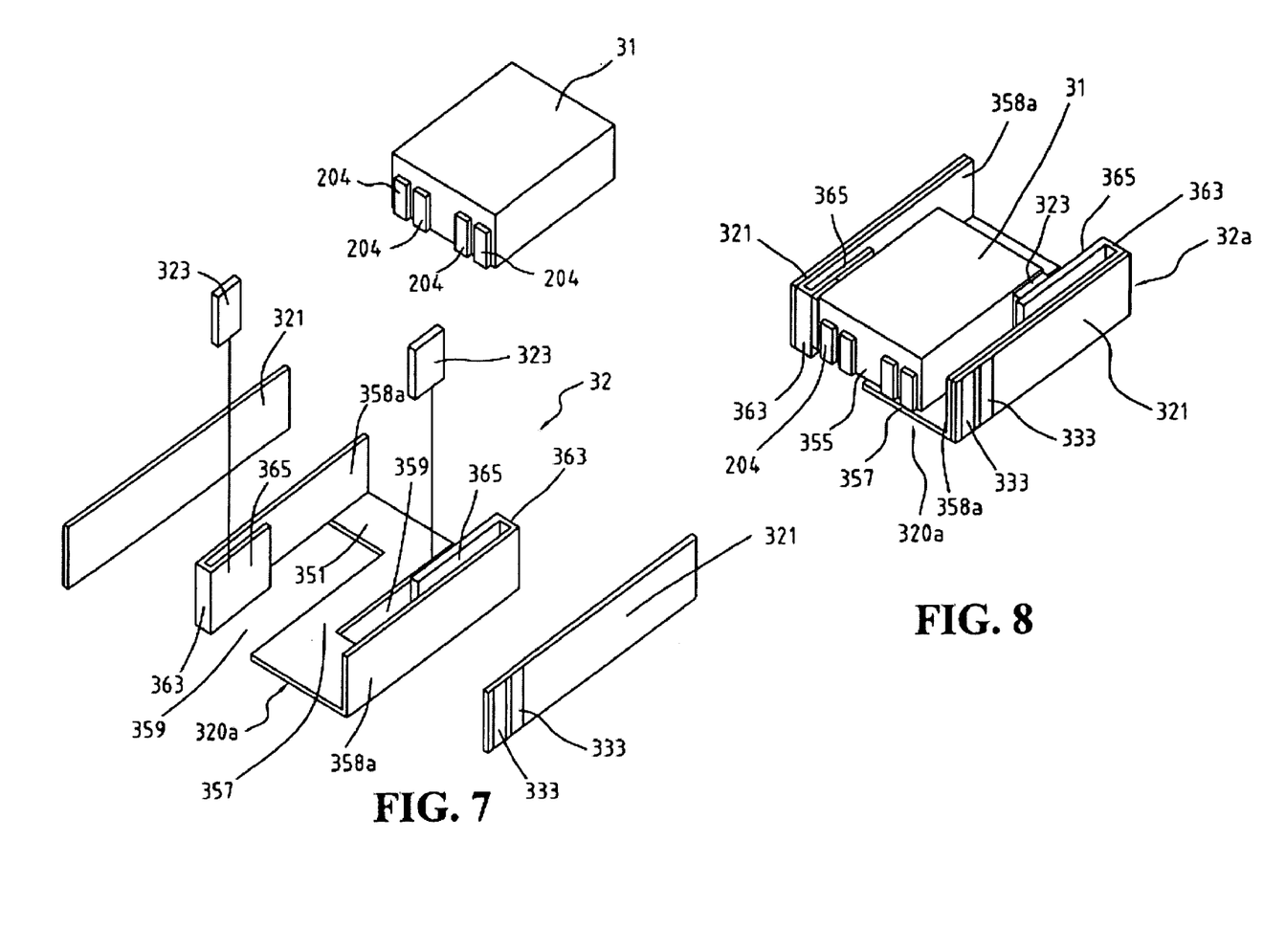
FIG. 7 is an exploded view of a micro-actuator constructed in accordance with FIG. 2.
FIG. 8 is an assembled view of FIG. 7.

Referring to FIGS. 7 and 8, which show a micro-actuator and slider subassembly constructed in accordance with a first embodiment of the invention. The micro-actuator 32 comprises a support base or frame 320a that receives and retains the slider 31 therein. The support base 320a comprises a bottom plate 357 and two side arms 358a mounted to opposite side edges of the bottom plate 357 and substantially perpendicular to the bottom plate 357. The side arms 358a are connected to opposite ends of the bottom plate 357 by connecting elements 351 projecting from the ends of the bottom plate 357 in opposite directions whereby a notch 359 extending along each side edge of the bottom plate 357 is formed between the side edge of the bottom plate 357 and each side arm 358a. Thus, each of the side arms 358a has an end fixed to the bottom plate 357 and an free end (not labeled). Both the free ends of the side arms 358a are in opposite positions. The notch 359 is of sufficient length to make the free end of the side arm 358a bendable and deflectable with respect to the bottom plate 357.

Also referring to FIGS. 7 and 8, the slider 31 is received between and fixed to the back-turned sections 365 of the side arms 358a by epoxy dots 323. Understandably, other adhesive dots can also be used here to replace the epoxy dots 323. This allows for movement of the slider 31 with the deflection of the side arms 358. The slider 31, however, is separated from the bottom plate 357 of the support base 320 of the micro-actuator 32 by a predetermined gap 360, see FIG. 6, which has a height of, for example 30 μm or higher. This facilitates smooth movement of the slider 31 when the micro-actuator 32 is operated.

Referring to FIGS. 7 and 8, two piezoelectric (PZT) elements 321 in the form of an elongate strip of thin film PZT elements, or ceramic PZT elements, are fixed to outside faces of the side arms 358a. Obviously, the PZT elements 321 can be attached to the side arms 358a in any other suitable means, such as fixed to inside faces of the side arms 358a. Preferably, the PZT elements 321 are of substantially the same shape and size as the outside faces of the side arms 358 with the back-turned section 365, whereby the PZT elements 321 completely overlap the outside faces of the side arms 358 with the back-turned section 365. Referring together with FIGS. 2-3, the PZT elements 321 have electrical contact pads 333 that are bonded with the metal balls 332 and are thus electrically connected to the control system of the disk drive 100 via the pads 310, the conductive traces 311 and the associated conductive pads 308. Such electrical connection allows the control system to apply electrical power to the PZT elements 321, which, due to the attachment of the PZT elements 321 to the outside faces of the side arms 358, causes deformation (deflection) of the side arms 358.

Figure 2:
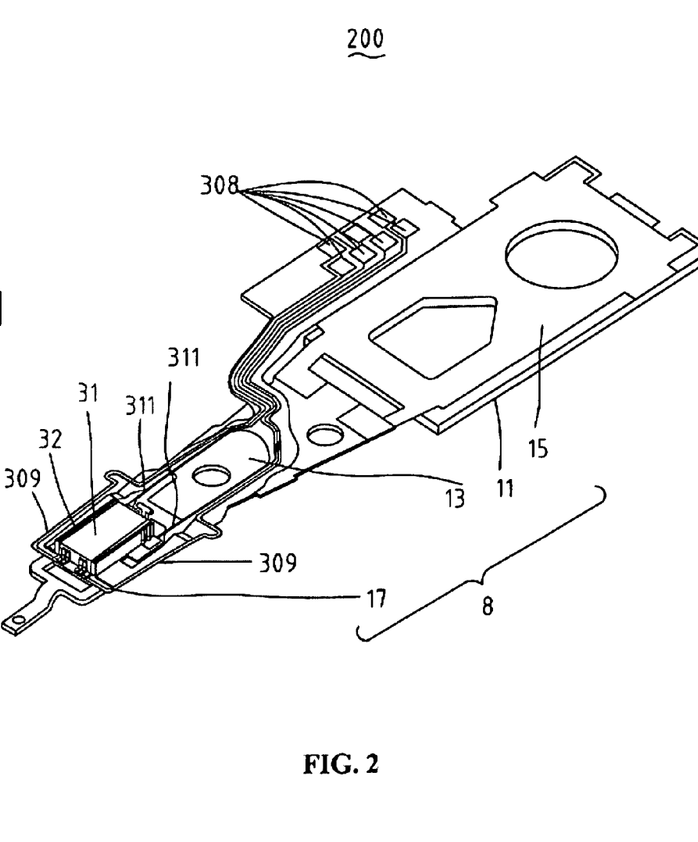
FIG. 2 is a perspective view showing a HGA constructed in accordance with a first embodiment of the present invention.
Figures 3, 4:
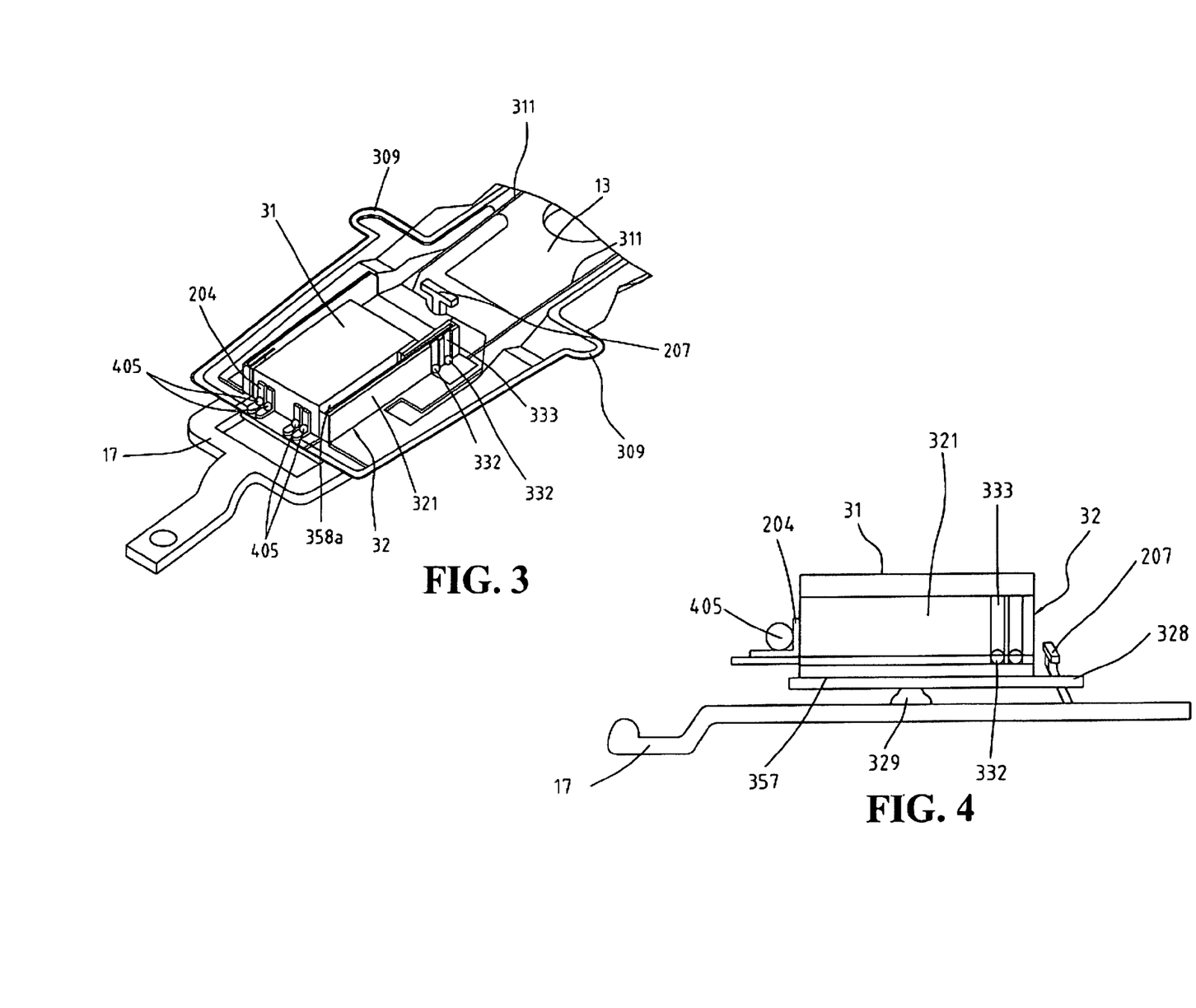
FIG. 3 is a perspective view in an enlarged scale showing a suspension tongue area of FIG. 2.
FIG. 4 is a side view of FIG. 3.
Figures 5, 6:
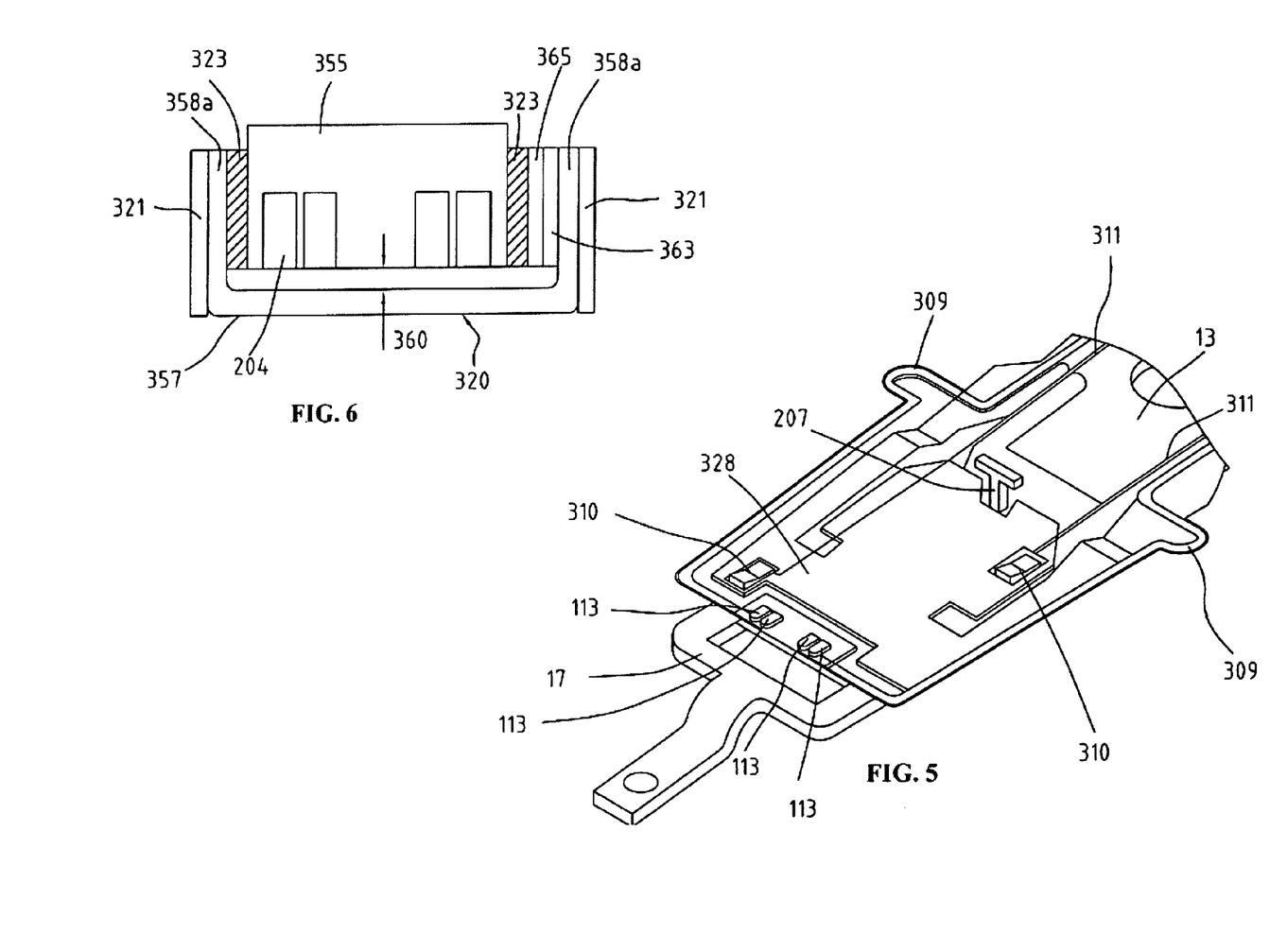
FIG. 5 is a partial, enlarged view of FIG. 3 without a micro-actuator and a slider.
FIG. 6 is an end view of the micro-actuator with the slider mounted therein.

Referring to FIGS. 2-3, the slider 31 has a trailing edge 355 which forms electrical pads 204 that are physically engageable with the metal balls 405 and are thus electrically connected to the control system of the disk drive 100 via the pads 113, the conductive traces 309 and the conductive pads 308. This establishes electrical communication between the slider 31 and the control system for transferring of data and signals.

Thus, referring to FIGS. 2-4, the slider 31 is carried by the micro-actuator 32, which is in turn carried by the suspension tongue 328 that is supported on the load beam 17 of the suspension 8. The load beam 17 forms a dimple 329 thereon to support the suspension tongue 328 whereby a loading force always acts upon a center of the slider 31. The bottom plate 357 of the support base 320 of the micro-actuator 32 is positioned on and mounted to the suspension tongue 328. A limiter 207 is formed on the load beam 17 and extends through the suspension tongue 328 to limit excessive movement of the suspension tongue 328 when the suspension tongue 328 is subject to undesired shocks and vibrations.

In the first embodiment of the micro-actuator 32 with reference to FIGS. 7 and 8, comprises a back-turned section 365 extending from the free end of each side arm 358a for fixing and supporting the slider 31 by the adhesive dots 323, which allows the side arm 358a to be extended to a length substantially greater than the lateral side dimension of the slider 31, as can be observed in FIG. 8. Thus, the length of the side arms 358a can be increased, which allows the PZT elements 321 attached to the side arms 358a to be elongated and thus improving the displacement performance of the micro-actuator 32. In the invention, the two back-turned section 365 are formed diagonally opposite to each other so as to rotate the bottom plate 357 when actuating the PZT elements 321.

Figures 9, 10:
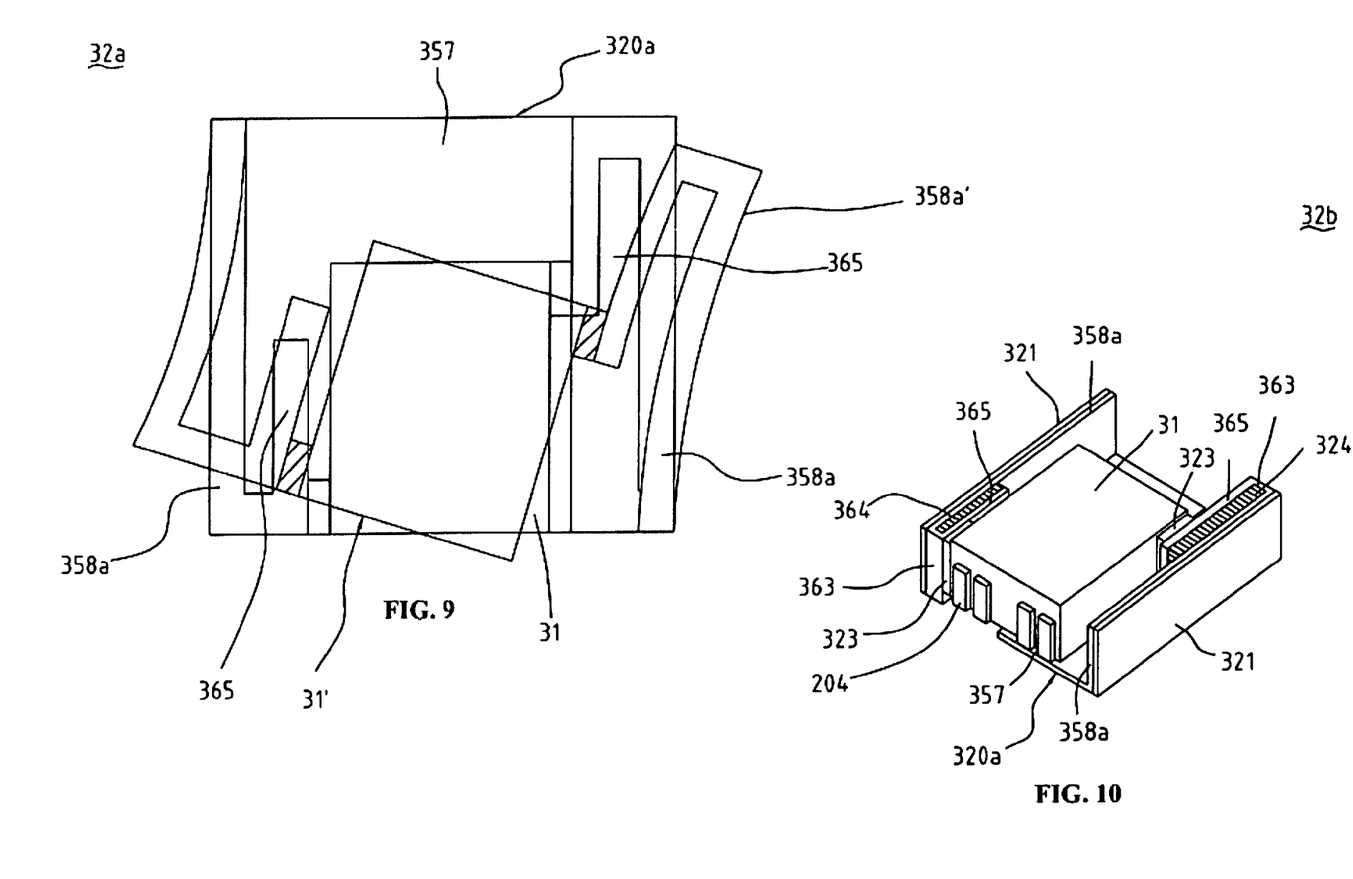
FIG. 9 is a plan view illustrating the operation of the micro-actuator of FIG. 8.
FIG. 10 is a perspective view of a micro-actuator and slider assembly constructed in accordance with a second embodiment of the present invention.

FIG. 9 illustrates the operation of the micro-actuator 32a. When no voltage is applied to the PZT elements 321 of the micro-actuator 32a, the support base 320 a of the micro-actuator 32a and the slider 31 stay in an initial position, where the side arms 358a are not deformed and the slider 31 is not moved by the deformation of the side arms 358a. On the other hand, when a voltage of predetermined level, such as a positive voltage, is applied to the PZT elements 321, the PZT elements 321 undergo deformation, which in turn causes deformation of the side arms 358a and the side arms 358a are deflected to the position shown in phantom lines and indicated by 358a'. With such a deformation, the slider 31 that is mounted to the side arms 358a is moved and the position of the slider 31, which is indicated at 31', is adjusted with respect to tracks on the surface of the disk 101. When a reversed level of voltage, such as a negative voltage, is applied to the PZT elements 321, deformation in opposite direction occurs and the slider 31 is moved in an opposite direction. Thus, by properly applying a voltage to the PZT elements 321, the position of the slider 31 can be selectively adjusted in both directions.

Referring to FIG. 10, a micro-actuator constructed in accordance with a second embodiment of the present invention is shown, which, generally designated with reference numeral 32b, comprises a modification of the micro-actuator 32a with reference to FIGS. 7 and 8, having the same construction with the difference in that an additional material 364 is filled in the free end of each side arm 358a for enhancing the performance of the micro-actuator 32b in for example displacement and resonance. That is the additional material 364 is interposed between the inside surface of each side arm 358a and the back-turned section 365. Examples of the additional material 364 include epoxy, adhesives, polymers, ceramics, and metals. The remaining structure of the micro-actuator 32b is identical to that of the micro-actuator 32a with parts thereof identified with the same reference numerals, and thus no further description is needed herein.

Figures 11A, 11B, 11C, 11D:
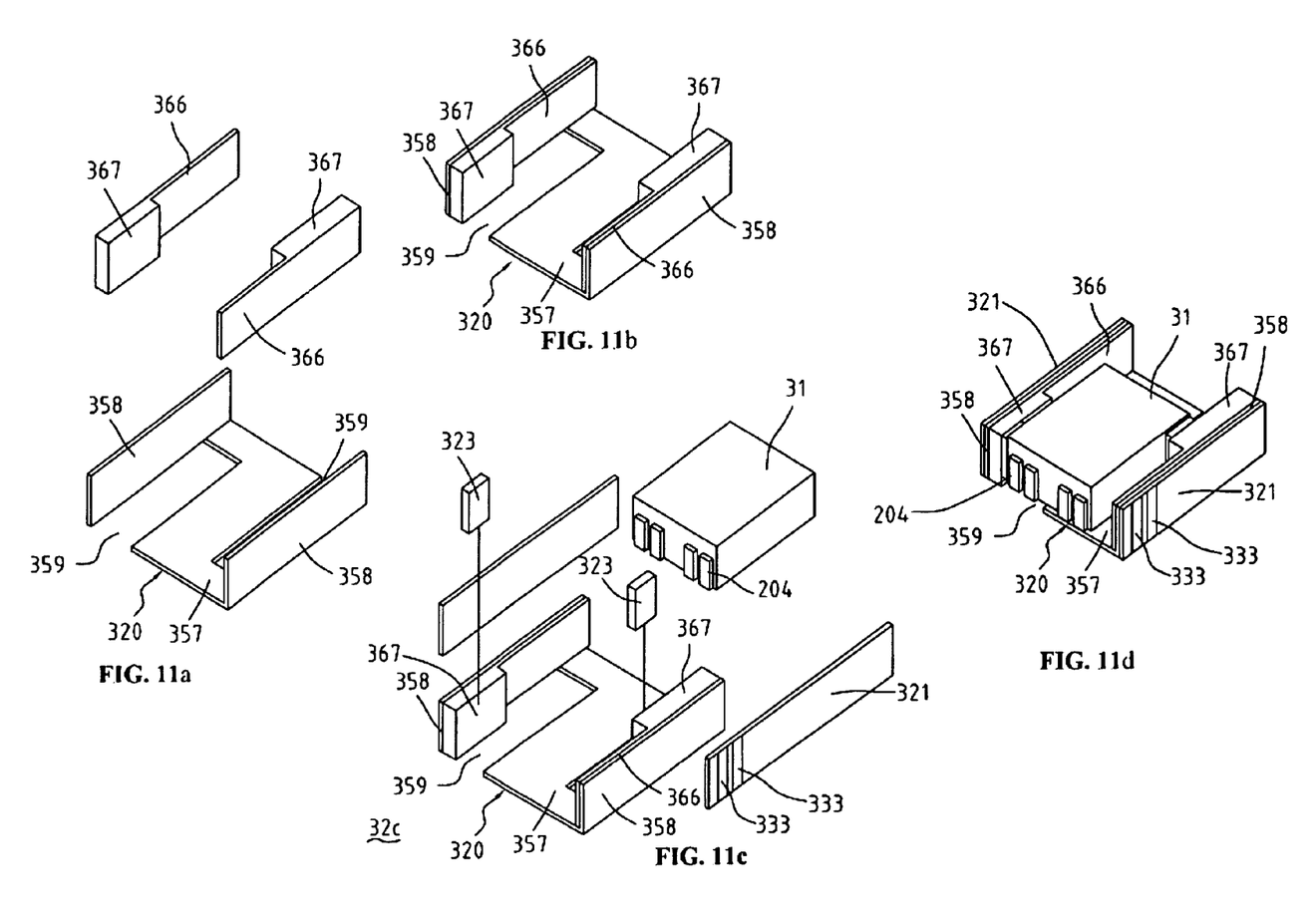

FIGS. 11a-11d illustrate a micro-actuator in accordance with a third embodiment of the present invention, which is generally designated with reference numeral 32c for distinction. The micro-actuator 32c has a construction similar to the micro-actuator 32 with reference to FIGS. 3a and 3b and thus similar parts are designated with the reference numerals and will not be further described. The difference between the micro-actuator 32c and the micro-actuator 32 is that a flat bar 366 is attached to the inside surface of each side arm 358. The flat bar 366 forms a step 367. The bars 366 are arranged to have the steps 367 diagonally opposite to each other as shown in FIG. 11b and the steps 367 correspond to the free ends of the side arms 358. The PZT elements 321 are mounted to the outside surfaces of the side arms 358, opposite to the respective flat bars 366. The slider 31 is received between the flat bars 366 and is fixed to the steps 367 by adhesive dots 323 interposed between each step 367 and corresponding lateral side of the slider 31. With the slider 31 fixed to the steps 367, the flat bars 366 allow the user of longer side arms 358 and thus longer PZT elements 321 attached to the side arms 358. Longer PZT elements 321 have improved performance in deflecting the side arms 358, which in turn enhances the overall performance of the micro-actuator 32c.

Examples of material for making the flat bars 366 include metals, polymers, and ceramics.

Figure 12A:
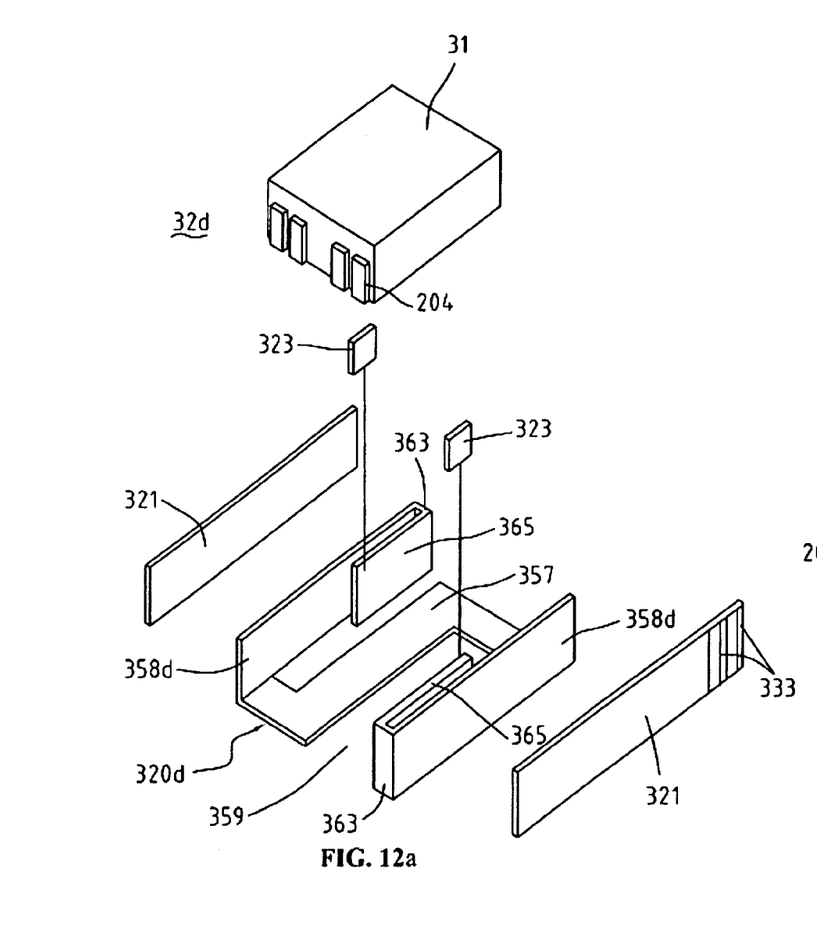
FIG. 12a is an exploded view of a micro-actuator constructed in accordance with a fourth embodiment of the present invention with the slider detached therefrom.
Figure 12B:
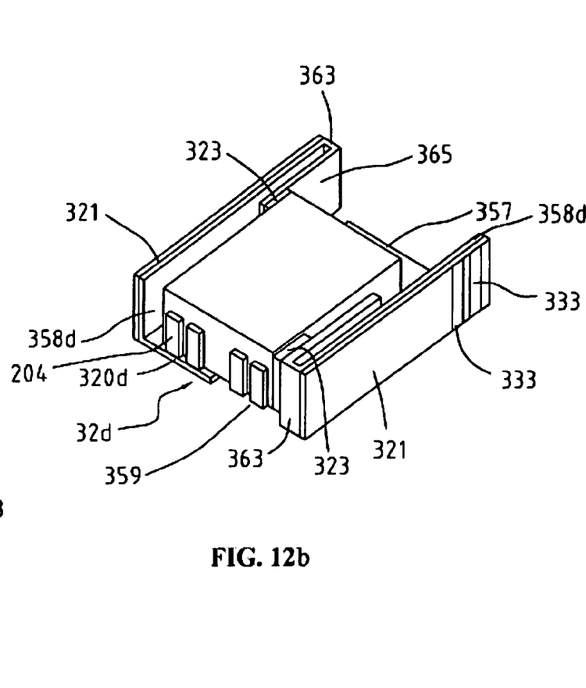
Figures 13A, 13B, 13C, 13D:
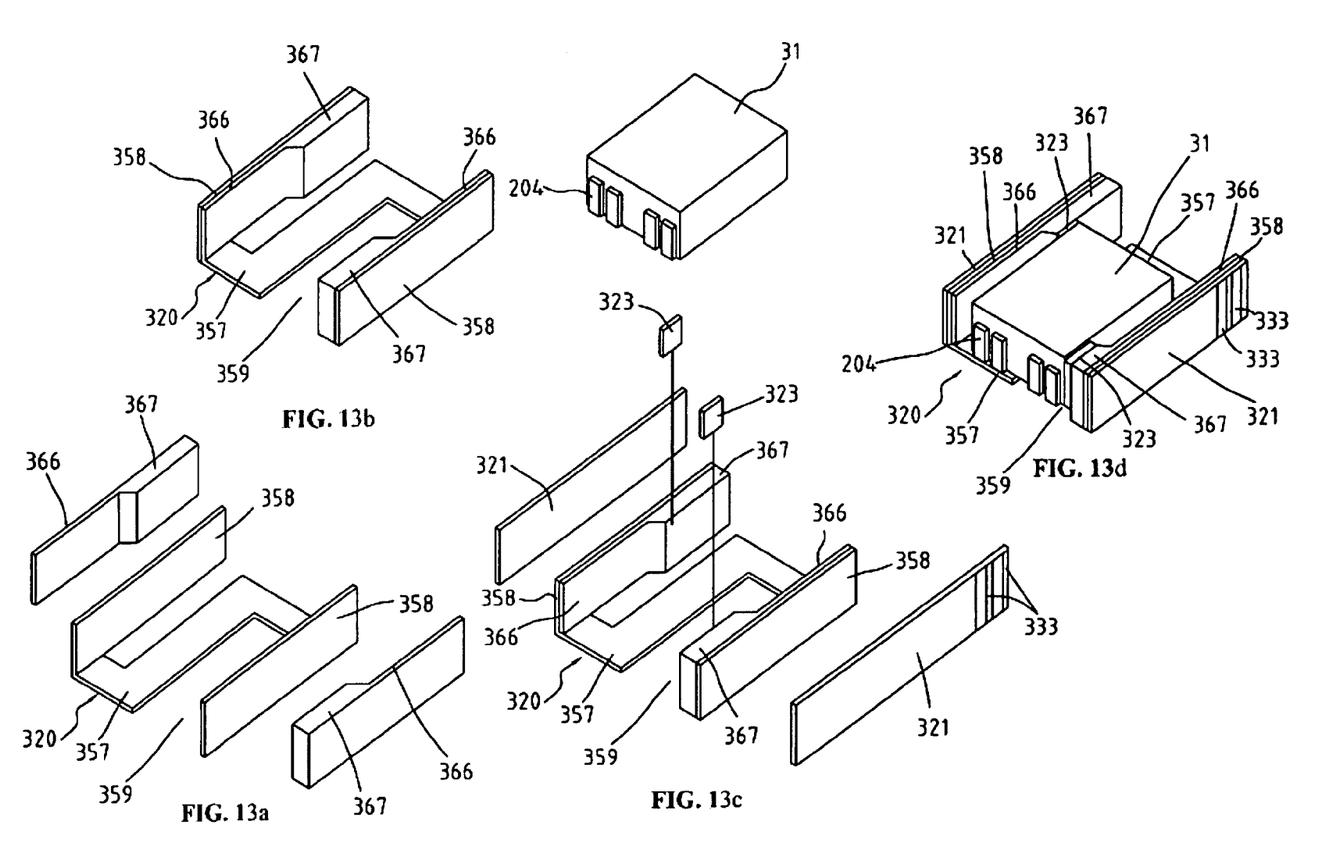

FIGS. 12a and 12b show a micro-actuator in accordance with a fourth embodiment of the present invention, which is designated with reference numeral 32d. The micro-actuator 32d has a construction that is mirror symmetric to the micro-actuator 32a with reference to FIGS. 7 and 8. The micro-actuator 32d has a support base 320d having two side arms 358d each having one end fixed to a bottom plate 357 and a free end having a back-turned section 365 connected to the side arm 358d by a connection 363. The free ends of the side arms 358d are arranged to be mirror image of those of the side arms 358b of the micro-actuator 32b.

FIGS. 13a-13d show a micro-actuator in accordance with a fifth embodiment of the present invention, which is designated with reference numeral 32e. The micro-actuator 32e has a construction mirror symmetric to the micro-actuator 32c with reference to FIGS. 11a-11d. The micro-actuator 32e comprises a flat bar 366 attached to an inside surface of each side arm 358 and the flat bar 366 has a step 367. The flat bars 366 of the micro-actuator 32e are arranged to have the steps 367 opposite to those of the micro-actuator 32c, making the micro-actuator 32e a mirror image of the micro-actuator 32c.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A micro-actuator comprising:
    a support base having two actuator side arms and a rotatable bottom plate positioned between the actuator side arms, wherein each of the two actuator side arms has a back-turned extension on one end thereof for fixing and supporting a slider between the two actuator side arms and the two back-turned extensions extend towards each other from opposite ends of the two actuator side arms;
    a pair of connection elements that respectively connect the rotatable bottom plate to the two actuator side arms from ends thereof opposite to the respective back-turned extensions;
    at least one PZT element bonded to the actuator side arms in its length and the back-turned extension, wherein the PZT element and the back-turned extension are disposed on the opposite sides of each of the two actuator side arms;
    wherein the rotatable plate rotates in a first direction when the at least one PZT element expands, and a second direction when the at least one PZT element contracts.

2. The micro-actuator as claimed in claim 1, wherein the actuator side arm comprises a side arm body, the back-turned extension extends from one end thereof toward the other end thereof, and a notch is formed between the side arm body and the back-turned extension.

3. The micro-actuator as claimed in claim 2, wherein the notch has additional material filled therein.

4. The micro-actuator as claimed in claim 3, wherein the additional material is selected from epoxy, adhesive, polymer, metal material.

5. The micro-actuator as claimed in claim 1, wherein the actuator side arm comprises a side arm body, and the back-turned extension is bonded on an end of the side arm body.

6. The micro-actuator as claimed in claim 5, wherein the back-turned extension has a solid structure.

7. The micro-actuator as claimed in claim 5, wherein the back-turned extension further comprises an elongated portion for bonding with the side arm body firmly.

8. A head gimbal assembly comprising:
    a slider;
    a micro-actuator; and
    a suspension for supporting the micro-actuator; wherein a parallel gap exists between the suspension and a bottom of the micro-actuator; wherein the micro-actuator comprises
    a support base having two actuator side arms and a rotatable bottom plate positioned between the actuator side arms, wherein each of the two actuator side arms has a back-turned extension on one end thereof and the two back-turned extension extend towards each other from opposite ends of the actuator side arms;
    a pair of connection elements that respectively connect the rotatable bottom plate to the two actuator side arms from ends thereof opposite the respective back-turned extensions;
    at least one PZT element bonded to the actuator side arms in its length and the back-turned extension, wherein the PZT element and the back-turned extension are disposed on the opposite sides of each of the two actuator side arms;
    wherein the rotatable plate rotates in a first direction when the at least one PZT element expands, and a second direction when the at least one PZT element contracts;
    wherein the slider is located between and bonded with the actuator side arms in two points which are diagonally opposite with each other, and the two points are on the back-turned extensions, respectively.

9. The head gimbal assembly as claimed in claim 8, wherein the actuator side arm comprises a side arm body, the back-turned extension extends from one end thereof toward the other end thereof, and a notch is formed between the side arm body and the back-turned extension.

10. The head gimbal assembly as claimed in claim 9, wherein the notch has additional material filled therein.

11. The head gimbal assembly as claimed in claim 10, wherein the additional material is selected from epoxy, adhesive, polymer, metal material.

12. The head gimbal assembly as claimed in claim 8, wherein the actuator side arm comprises a side arm body, and the back-turned extension is bonded on an end of the side arm body.

13. The head gimbal assembly as claimed in claim 12, wherein the back-turned extension has a solid structure.

14. The head gimbal assembly as claimed in claim 12, wherein the back-turned extension further comprises an elongated portion for bonding with the side arm body firmly.

15. The head gimbal assembly as claimed in claim 8, wherein the slider is suspended on the rotatable bottom plate and the rotatable bottom plate of the micro-actuator is bonded with the suspension.

16. A disk drive unit comprising:
    a head gimbal assembly, comprising a slider, a micro-actuator and a suspension supporting the micro-actuator;
    a drive arm connected to the head gimbal assembly;
    a disk; and
    a spindle motor operable to spin the disk;
    wherein the micro-actuator comprises:
    a support base having two actuator side arms and a rotatable bottom plate positioned between the actuator side arms, wherein each of the two actuator side arms has a back-turned extension on one end thereof and the two back-turned extensions extend towards each other from opposite ends of the two actuator side arms;

a pair of connection elements that respectively connect the rotatable bottom plate to the two actuator side arms from ends thereof opposite to the respective back-turned extensions;

at least one PZT element bonded to the actuator side arms in its length and the back-turned extension, wherein the PZT element and the back-turned extension are disposed on the opposite sides of each of the two actuator side arms;

wherein the rotatable plate rotates in a first direction when the at least one PZT element expands, and a second direction when the at least one PZT element contracts;

wherein the slider is located between and bonded with the actuator side arms in two points which are diagonally opposite with each other, and the two points are on the back-turned extensions, respectively.

* * * * *